United States Patent
Tessier et al.

(10) Patent No.: US 12,090,989 B2
(45) Date of Patent: Sep. 17, 2024

(54) SYSTEM AND METHOD USING WIRELESS LATCHING RELAY FOR VEHICLE SHARING

(71) Applicant: FORTIN SYSTÈMES ÉLECTRONIQUES, Montreal (CA)

(72) Inventors: Martin Tessier, Repentigny (CA); Duc Minh Cong Nguyen, St-Leonard (CA)

(73) Assignee: FORTIN SYSTÈMES ÉLECTRONIQUES, Anjou (CA)

( * ) Notice: Subject to any disclaimer, the term of this patent is extended or adjusted under 35 U.S.C. 154(b) by 318 days.

(21) Appl. No.: 17/663,677

(22) Filed: May 17, 2022

(65) Prior Publication Data

US 2022/0363235 A1 Nov. 17, 2022

Related U.S. Application Data

(60) Provisional application No. 63/201,886, filed on May 17, 2021.

(51) Int. Cl.
| | |
|---|---|
| *B60R 25/045* | (2013.01) |
| *B60W 10/30* | (2006.01) |
| *G07C 9/00* | (2020.01) |
| *H04W 4/48* | (2018.01) |

(52) U.S. Cl.
CPC ............ *B60W 10/30* (2013.01); *B60R 25/045* (2013.01); *G07C 9/00174* (2013.01); *H04W 4/48* (2018.02); *G07C 2009/00769* (2013.01)

(58) Field of Classification Search
None
See application file for complete search history.

(56) References Cited

U.S. PATENT DOCUMENTS

| | | | | |
|---|---|---|---|---|
| 4,926,332 A | * | 5/1990 | Komuro | ............ G07C 9/00722 340/5.72 |
| 9,893,797 B2 | * | 2/2018 | Sloan | ................. H04B 7/15528 |

\* cited by examiner

*Primary Examiner* — Todd Melton
(74) *Attorney, Agent, or Firm* — LAVERY, DE BILLY, LLP; Gonzalo Lavin

(57) ABSTRACT

A system and method for controlling a transmission of electrical signals in a vehicle wiring harness (12) of a vehicle (10). The system includes: a vehicle sharing control unit (14) including a controller (16) and a transmitter (18) for transmitting wirelessly vehicle sharing control signals (20); a wireless latching relay (22) including a receiver (24) configured for receiving the vehicle sharing control signals (20) from the transmitter (18), and a latching relay (26). In use, the vehicle wiring harness (12) is cut to define first and second ends (28, 30), and the first and second ends (28, 30) are connected in series with the latching relay (26).

7 Claims, 3 Drawing Sheets

SYSTEM AND METHOD USING WIRELESS LATCHING RELAY FOR VEHICLE SHARING

CROSS REFERENCE TO RELATED APPLICATION

This application claims priority on U.S. Provisional Application No. 63/201,886, filed on May 17, 2021, which is herein incorporated by reference in its entirety.

FIELD OF THE INVENTION

The present invention relates to after-market installations such as car-sharing applications or fleet management for vehicles. In particular, the invention relates to a vehicle security system and methods that prevent thefts of vehicles.

BACKGROUND OF THE INVENTION

New technologies in the domain of the automotive security restrain after-market installations, such as car-sharing or fleet management applications in vehicles. In some cases, the after-market products are not compatible with these automotive innovations. Formerly, the driver would mechanically insert a key in the barrel in order to start the vehicle. Today, many vehicles electronically validate the key that the driver is attempting to use to start the vehicle and either is permissive and allows the vehicle to start, or is restrictive and inhibits the vehicle from starting. In this case, the key or proximity remote is able to communicate to the vehicle using radio signals. If the pre-programmed key or remote is not within proximity when the driver attempts to start the vehicle various countermeasures inhibit the vehicle from starting. However, if a valid proximity remote was left somewhere within the vehicle, the vehicle would never inhibit itself from starting thus allowing anyone to start the vehicle at any time.

The drawbacks of known vehicle anti-theft systems and methods is that they are relatively complex and expensive. There is therefore a need for a simple yet efficient anti-theft system and method that can be used in vehicle sharing applications.

SUMMARY OF THE INVENTION

According to the present invention, there is provided a system for controlling a transmission of electrical signals in a vehicle wiring harness of a vehicle, the system comprising: a vehicle sharing control unit including a controller and a transmitter for transmitting wirelessly vehicle sharing control signals; a wireless latching relay including a receiver configured for receiving the vehicle sharing control signals from the transmitter, and a latching relay; wherein the vehicle wiring harness is cut to define first and second ends, the first and second ends being connectable in series with the latching relay.

According to another aspect of the present invention, there is provided a method for controlling a transmission of electrical signals in a vehicle wiring harness of a vehicle, the method comprising: installing a vehicle sharing control unit including a controller and a transmitter for transmitting wirelessly vehicle sharing control signals; cutting the vehicle wiring harness such as to define first and second ends; installing a wireless latching relay including a receiver configured for receiving the vehicle sharing control signals from the transmitter, and a latching relay; connecting the first and second ends of the vehicle wiring harness in series with the latching relay.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
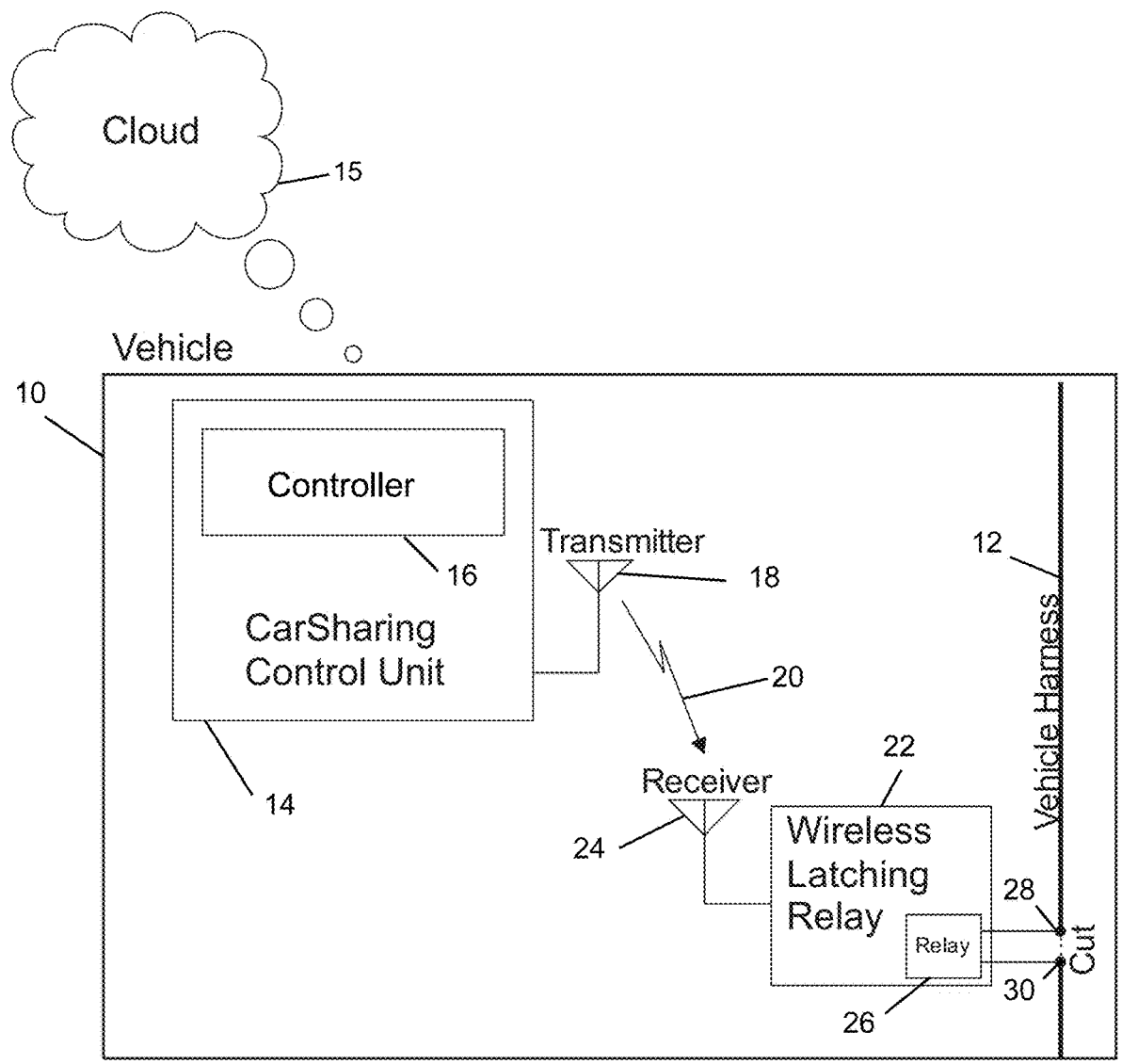
FIG. 1 is a block diagram of a system, according to a preferred embodiment of the present invention.

Referring now to FIG. 1, and in accordance with an illustrative embodiment of the present invention, a system for controlling a transmission of electrical signals in a vehicle wiring harness 12 of a vehicle 10, will now be described. The system includes vehicle sharing control unit 14 with a controller 16 and a transmitter 18 for transmitting wirelessly vehicle sharing control signals 20. The vehicle sharing control unit 14 is configured to be in communication with an external cloud 15, as is known by persons skilled in the art. The system also includes a wireless latching relay 22 with a receiver 24 configured for receiving the vehicle sharing control signals 20 from the transmitter 18, and a latching relay 26. In use, the vehicle wiring harness 12 is cut to define first and second ends 28, 30. The first and second ends 28, 30 are connectable in series with the latching relay 26.

As known by persons skilled in the art, a vehicle wiring harness is an organized set of wires, terminals and connectors that run throughout an entire vehicle and relay information and electric power. The vehicle wiring harness thereby plays a critical role in connecting a variety of electrical components of the vehicle.

Figure 2:
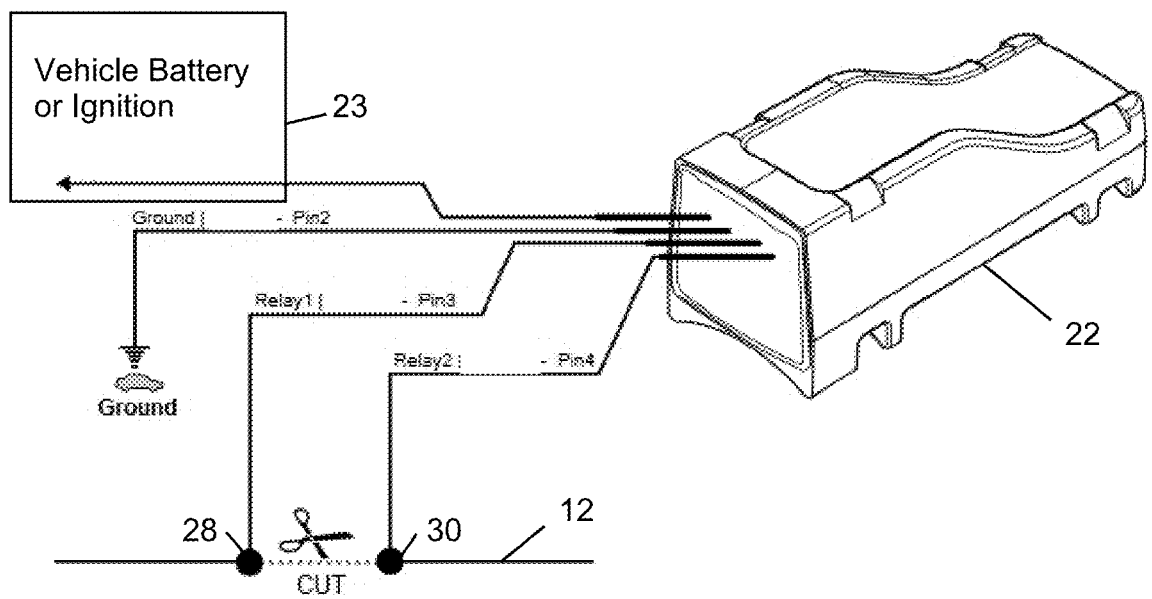
FIG. 2 is a perspective view of a wireless latching relay module connected to a vehicle wiring harness, according to a preferred embodiment of the present invention.

Referring now to FIG. 2, in addition to FIG. 1, in this example, the wireless latching relay 22 is shown connected to a 12 V power supply or ignition 23 and at ground at Pin 2. The wireless relay 22 is connected to first end 28 and second end 30 of the vehicle wiring harness that 12 has been cut.

Figure 3:
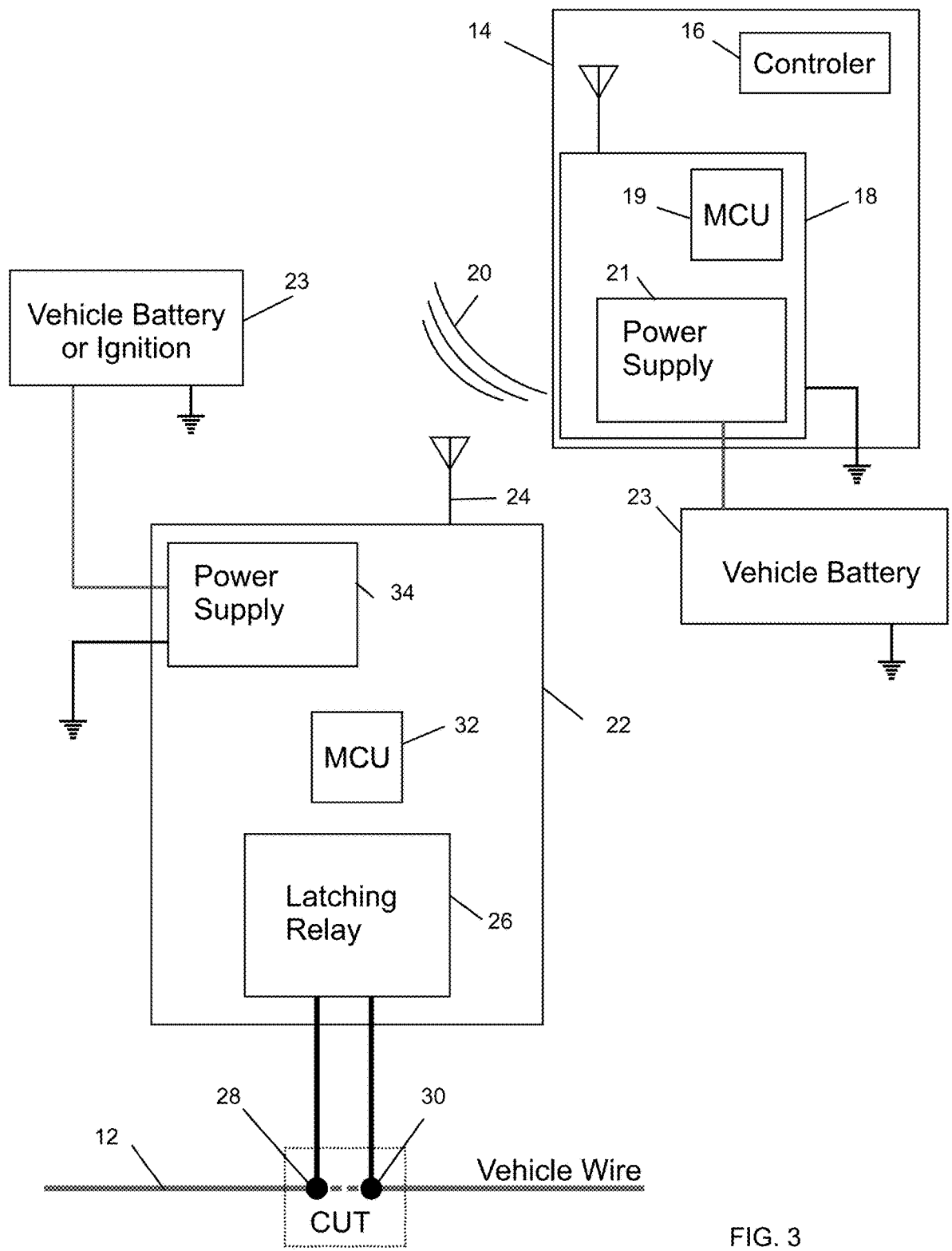
FIG. 3 is a block diagram of a system, according to a preferred embodiment of the present invention.

Referring now to FIG. 3, in addition to FIG. 1 and FIG. 2, the system includes vehicle sharing control unit 14 with a controller 16 and a transmitter 18 for transmitting wirelessly vehicle sharing control signals 20. The transmitter 18 includes a microcontroller unit (MCU) 19 and a power supply 21 connected to a vehicle battery 23. The system also includes the wireless latching relay 22 with the receiver 24 configured for receiving the vehicle sharing control signals 20 from the transmitter 18, and a latching relay 26. The wireless latching relay 22 includes a microcontroller unit (MCU) 32 and a power supply 34 connected to the vehicle battery 23 or ignition. In use, the vehicle wiring harness 12 is cut to define first and second ends 28, 30. The first and second ends 28, 30 of a wire of the vehicle wiring harness 12 are connectable in series with the latching relay 26.

The system and method, according to the present invention aim to reduce car theft in car fleets. During the installation, one installs the master module under the dashboard and hides in the vehicle a wireless communication and wireless latching relay 22. The goal and advantage of the present invention is to cut an electronic circuit in the vehicle to prevent it from engine start.

The present system and method according to the present invention do not require any physical connection to the master module and the wireless latching relay 22 can be installed anywhere in the vehicle 10. The wireless latching relay 22 has an extreme advantage of zero power consumption and it retains its state regardless of the vehicle power supply.

If a bad actor can get access to the control module under the dashboard of the vehicle 10, the bad actor still may not be able to find the anti-theft device, i.e. the wireless latching relay 22 because it is installed elsewhere in the vehicle 10. The latching relay 26 will keep its state (armed) and the vehicle will not be able to start. More than one wireless latching relay 22 may be installed in the same vehicle to enhance the security.

Conventional relays are unreliable, easy to deactivate and drain the vehicle battery.

However, a latching relay, also called impulse, bistable, keep, or stay relay, or simply latch, maintains either contact position indefinitely without power applied to the coil. The advantage is that one coil consumes power only for an instant while the relay is being switched, and the relay contacts retain this setting across a power outage. A latching relay allows remote control of building lighting without the hum that may be produced from a continuously (AC) energized coil.

The wireless latching relay 22 can also be used to power an OEM remote key fob. The advantage of this method is that the remote can be installed anywhere in the car and authorize the vehicle to start when the wireless latching relay 22 is activated.

The scope of the claims should not be limited by the preferred embodiments set forth in the examples but should be given the broadest interpretation consistent with the description as a whole.

The invention claimed is:

1. A system for controlling a transmission of electrical signals in a vehicle wiring harness (12) of a vehicle (10), the system comprising:

a vehicle sharing control unit (14) including a controller (16) and a transmitter (18) for transmitting wirelessly vehicle sharing control signals (20);

a wireless latching relay (22) including a receiver (24) configured for receiving the vehicle sharing control signals (20) from the transmitter (18), and a latching relay (26);

wherein the vehicle wiring harness (12) is cut to define first and second ends (28, 30), the first and second ends (28, 30) being connectable in series with the latching relay (26).

2. The system of claim 1, wherein the transmitter (18) includes a microcontroller unit (19).

3. The system of claim 2, wherein the microcontroller unit (19) is powered by a power supply (21) connected to a vehicle battery (23).

4. The system of claim 1, wherein the transmitter wireless latching relay (22) includes a microcontroller unit (32) and a power supply (34) connected to a vehicle battery (23) or ignition.

5. A method for controlling a transmission of electrical signals in a vehicle wiring harness (12) of a vehicle (10), the method comprising:

installing a vehicle sharing control unit (14) including a controller (16) and a transmitter (18) for transmitting wirelessly vehicle sharing control signals (20);

cutting the vehicle wiring harness (12) such as to define first and second ends (28, 30);

installing a wireless latching relay (22) including a receiver (24) configured for receiving the vehicle sharing control signals (20) from the transmitter (18), and a latching relay (26);

connecting the first and second ends (28, 30) of the vehicle wiring harness (12) in series with the latching relay (26).

6. The method of claim 5, wherein the transmitter (18) includes a microcontroller unit (19), and powering the microcontroller unit (19) by a power supply (21) connected to a vehicle battery (23).

7. The method of claim 5, wherein the latching relay (22) includes a microcontroller unit (32), and powering the microcontroller unit (32) with a power supply (34) connected to a vehicle battery (23) or ignition.

\* \* \* \* \*